May 26, 1936.  C. O. HOOVER  2,042,054
PROCESS FOR SWEETENING HYDROCARBON OIL
Filed Nov. 11, 1930   3 Sheets-Sheet 1
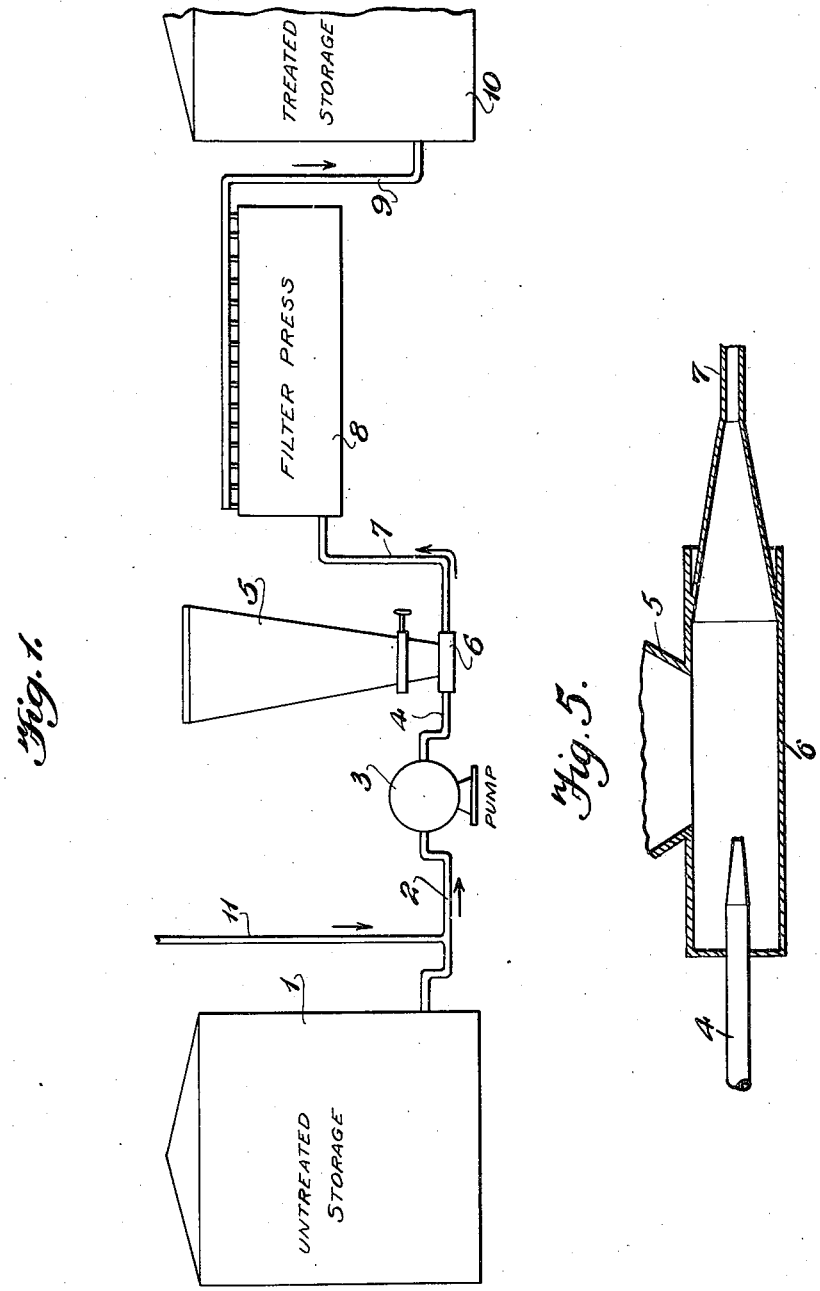
INVENTOR.
Charles O. Hoover.
BY
Sinton, Kellogg & Smith
ATTORNEYS.

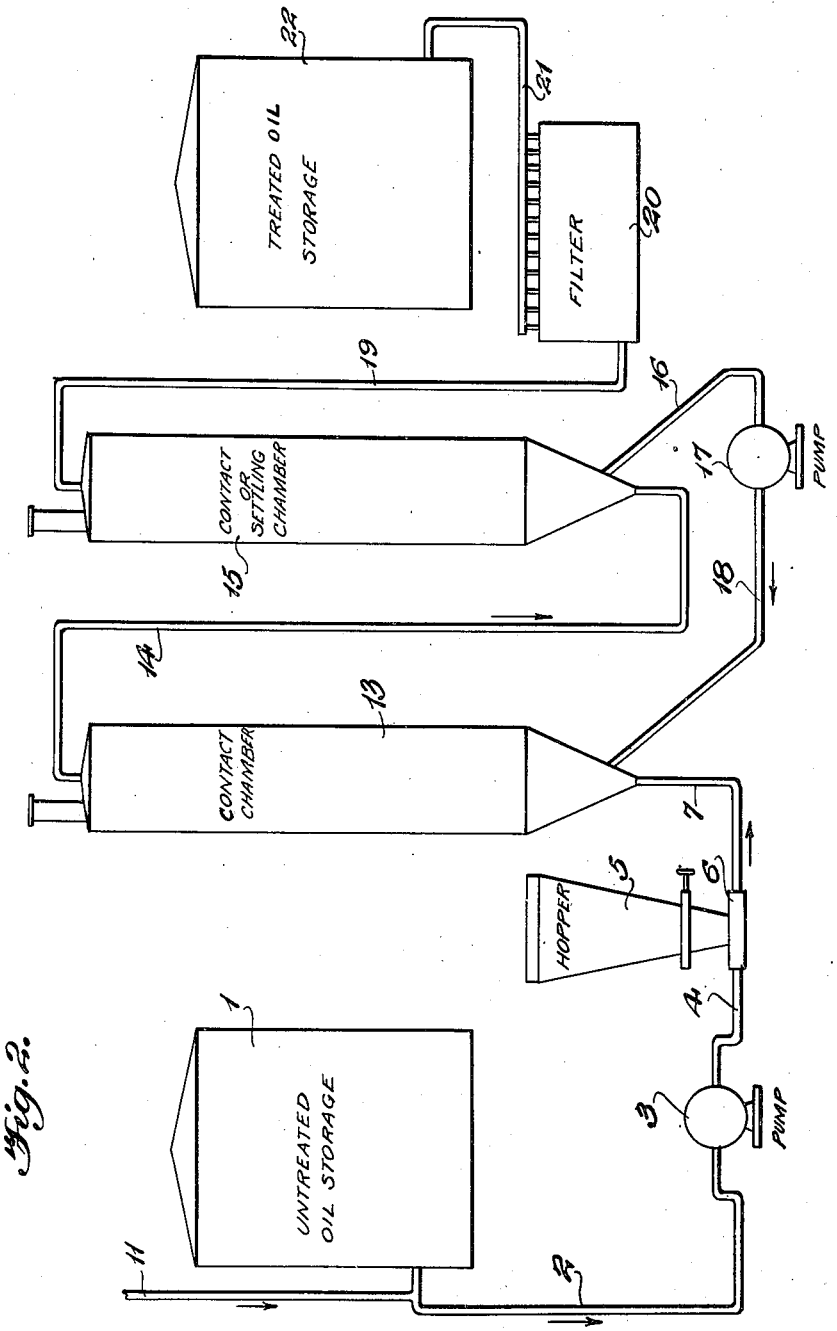

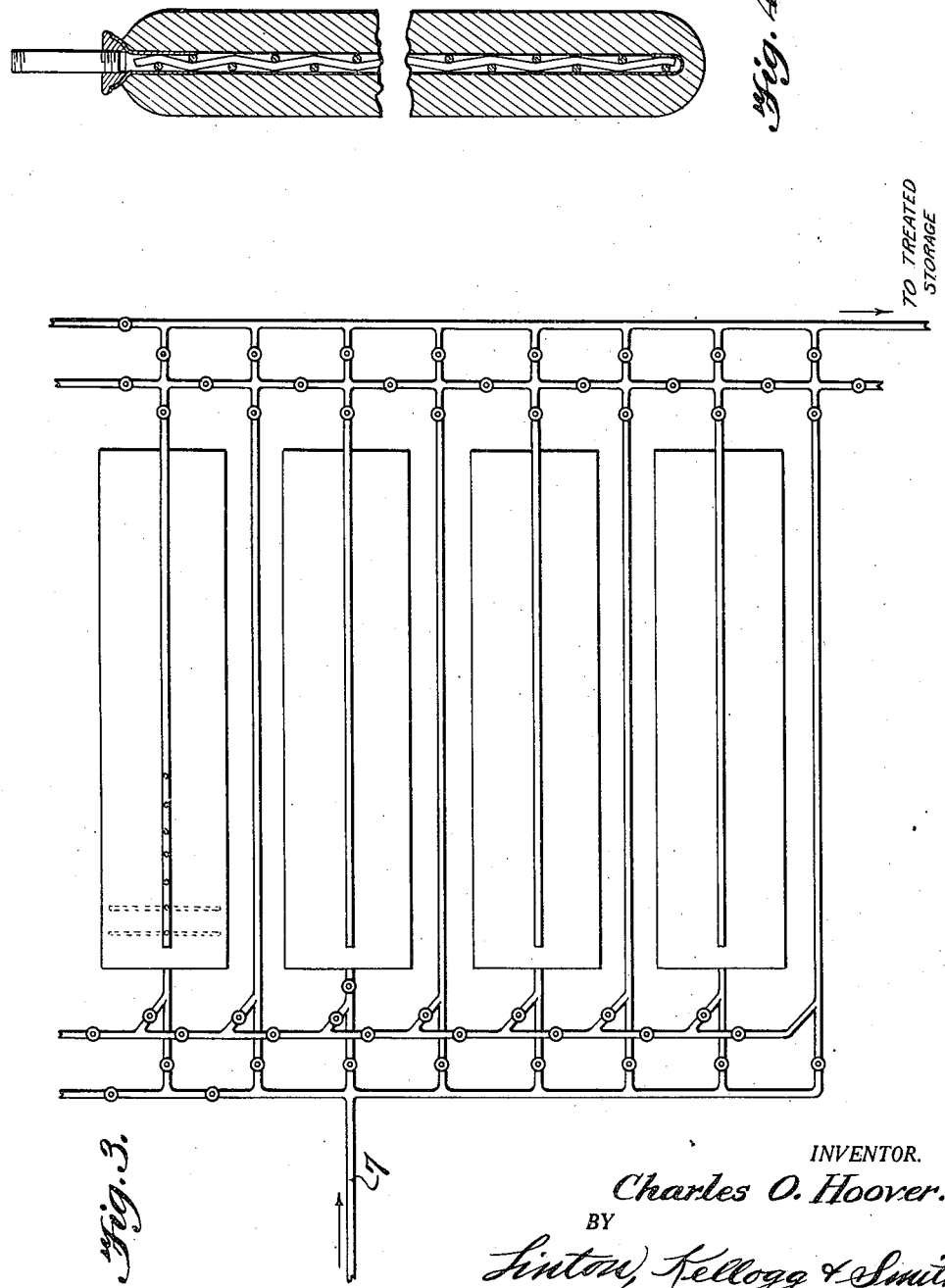

Patented May 26, 1936

2,042,054

UNITED STATES PATENT OFFICE 2,042,054

PROCESS FOR SWEETENING HYDROCARBON OIL

Charles O. Hoover, San Antonio, Tex., assignor to Bennett-Clark Co., Inc., San Antonio, Tex., a corporation of Texas Application November 11, 1930, Serial No. 494,973

7 Claims. (Cl. 196—29)

The present invention relates to the purification of mineral oil materials and particularly the relatively light mineral oil distillates such as gasolene, kerosene and the like, for removing or altering "sour compounds" namely, compounds which contain sulphur, including organic sulphur compounds such as mercaptans and also free sulphur and hydrogen sulphide, as well as any organic sulphur compounds which may have been formed in the oil by treatment with sulphuric acid or sulphur dioxide or other acid compounds containing sulphur with which the oils or distillates have been treated.

The process is especially important in the case of treating gasolene and similar light fractions, produced from oils containing relatively large amounts of sulphur compounds existing in the form of organic sulphur compounds.

An object of the present invention is to provide a highly efficient solid chemical, in a finely divided state, capable of reacting with the sulphur compound in the oil. A further object of the invention is the provision of novel modes of applying finely divided solid reagents to the treatment and purification of mineral oil distillates.

In the accompanying drawings I have shown diagrammatically certain kinds of apparatus which may be used in carrying out the treatment, but it is to be understood that the invention is in no sense restricted to these particular types of apparatus.

Figure 1 shows a diagrammatic view of one modification of the process in which the filter press, or a series of filter presses constitute the essential treating element.

Figure 2 shows a system of apparatus in which the treatment is largely effected in contact or settling chambers, these being preferably provided with conical bottoms in order that there will be a considerable amount of agitation of the distillates in the bottom of the treating tank, while the upper portion of the tank is of larger diameter so as to allow the chemical to settle out from the oil after it has been well contacted therewith in the lower part of the tank.

Figure 3 shows a convenient arrangement of several filter presses, whereby the oil may be passed through a number of the presses in any desired sequence, and whereby the filter press or presses which have become completely fouled by the removal of impurities from the oil can be cut out temporarily for recharging.

Referring more particularly to Figure 1, which constitutes the showing of the apparatus for the preferred modification of the process, the untreated oil from tank 1 is passed by pipe line 2 through pump 3 and pipe line 4 into an aspirator device which constitutes a mixing chamber designated as 6, and in which the oil is mixed with dry pulverulent chemicals from the hopper or supply tank 5. The oil then passes through pipe 7 into one or more filter presses 8, the filtered oil passing out through pipe 9 into storage tank 10.

In referring to the oil in tank 1 as "untreated" this does not mean that the oil at this stage must not have undergone any treatment whatsoever. In fact the oil preferably has been distilled and may also have been treated with sulphuric acid or similar reagent, by any desired or approved method. During the first part of the process the pulverulent material will be introduced from hopper 5 into the mixing chamber 6, until the leaves of the filter press have accumulated a sufficiently dense and thick coating, to act as a filter. This coating on the leaves of the press may be from half an inch up to two inches or even more inches in thickness, depending upon the amount and character of the impurities in the oil under treatment. When such a sufficient quantity of material has been deposited upon the leaves of the filter press, the outlet of the hopper 5 is closed which prevents the introduction of further quantities of the purifying chemical into the oil under treatment. The pump 3 is of a sufficient capacity to build up any desired amount of pressure in the pipe line 7 and in the intake side of the filter press. The amount of pressure can be varied between wide limits, say from 5 or 10 pounds up to 100 pounds, of course a sufficient amount of pressure is employed to drive the oil through the cakes of filtering material deposited on the leaves of the filter press.

Having built up a substantial cake of the purifying chemical upon each of the leaves of the filter press, as shown for example in Figure 4 of the drawings, the distillate can be passed through this cake or layer for a considerable time, and the chemical contained in the cake will treat the oil or distillate by reaction with the sulphur compounds therein. After a time the filtration may be found to be only partially successful in removing the sulphur compounds, and when this stage has been reached the distillate may pass from a first filter press into and through a second filter press already provided with cakes of the purifying agent. The apparatus can be run in this condition until it is found that the cakes of the material in the first filter press are practically inactive, and are removing or altering practically no sulphur compounds. Then this first filter press can be cut out of the system and the distillate can pass directly to the second filter press, while the first press will be recharged with fresh filtering material.

The dry chemical which I preferably employ is made from clay of a highly absorbent or adsorbent character as the major component. This also carries a metal compound for example, a salt of copper, although salts of other metals may be employed or compounds may be employed which are not salts, for example, hydroxides and with some oils oxides may be used. The preferred treating reagent is cupric chloride, although other salts of copper such as the sulphates or copper hyroxide may be used. Salts or hydroxides or oxides of other metals such as iron, zinc, lead, mercury, aluminum, cadmium and other metals may be employed, or mixtures of these. These compounds and salts may be generally characterized or described as compounds and salts which react with mercaptans to form mercaptides. Also metals may be employed with the salts, for example, metallic iron may be used with copper chloride. Copper sulphide in admixture with an adsorbent material such as absorbent or adsorbent clay may also be employed in sweetening sour hydrocarbon oil.

Very satisfactory results may be produced by mixing clay with an equal amount of copper chloride, and grinding the mixture in a ball mill until it passes through a 200 mesh screen, or until most of it passes through such a screen and the entire material would pass through a 100 mesh screen. This may be then mixed with a considerable amount of additional clay of about the same degree of fineness, either in the ball mill or in any other suitable manner.

In many cases it is also advisable to employ a highly oxidizing salt, and for this purpose I may mix potassium permanganate or potassium manganate with clay and reduce this mixture to the fine state above referred to, and then add this to the mixture of clay and copper chloride. Very satisfactory results are produced by using a reagent containing say 90% of dry clay, 5% of cupric chloride and 5% of potassium permanganate.

The oxidizing salt may be omitted in some cases, for example, where the sulphur content is quite low and where no elementary sulphur is present in the oil. With oils containing elemental sulphur, for example, with gasolene containing elemental sulphur or with gasolenes which are high in total sulphur, and with the heavier distillates such as kerosene, naphtha and the like, or with pressure distillates whether or not they contain elemental sulphur and whether or not they are high in sulphur, it is advisable to employ the oxidizing salt.

A particular advantage of the form of apparatus shown in Figure 1 is that the oil and the clay are not in contact with each other for a long period. The continued contact of clay with gasolene, and particularly with the cracked gasolenes or gasolenes containing a large amount of unsaturated compounds is well known to produce gums by polymerization of the unsaturated compounds. In my process the time of contact of the oil with the clay is very short and the formation of gum is avoided and the amount of gum in the gasolene may be substantially reduced, perhaps by absorption of the same in the clay.

In many cases, gasolene, kerosene, naphtha and the like, may be improved simply by filtration, by the method illustrated in Figure 1, through clay alone. This is also a highly important step in the treatment of gasolenes which have been subjected to sodium plumbite or "doctor" solution, and from which, as well known, the lead is ordinarily precipitated by adding a small amount of free sulphur. I find that it is entirely possible to wholly eliminate the addition of free sulphur, or to add what would be considered in the prior practice a wholly insufficient amount of free sulphur, and then filter the gasolene through the filter presses containing a bed of clay on the leaves of the press. By this method the lead mercaptides seem to be at least partly removed. The treatment also does not produce any gum in the oil or does not leave a gasoline which has a high tendency to form gum on standing.

In the ordinary treatment of gasoline, for example, in the system illustrated in Figure 1 of the drawings, if the gasoline has been treated with sulphuric acid, according to any of the standard procedures, I find it is inadvisable to wash the gasoline or otherwise attempt to remove all of the remaining $SO_2$. The gasoline still containing some $SO_2$ can be passed through the system as here illustrated, and will come out of the filter press entirely neutral. In the treatment of gasoline which has not been subjected to sulphuric acid treatment, if the mercaptan content of the oil is rather high, for example, in pressure still distillates, I would recommend adding a small amount of sulphur dioxide, for example, half a per cent or less, through the pipe 11. Hydrogen sulphide could be added in a similar manner and in about the same percentage or less. Other acids, for example, hydrochloric acid gas could be similarly introduced this being in small amount, say a quarter of a per cent or less. Even when adding such acids the gasoline comes out of the filter press entirely neutral. This step is of material help in the treatment of gasolines which are rather dark in color, and the color of the filtered gasoline will be found to be very much improved by the treatment. This step is of material help in the case of oils which contain elementary sulphur in solution, aiding in removing the same.

Referring now more particularly to Figure 2 of the drawings this shows a modified mode of treating oil with the above mentioned reagents. The distillate comes from the tank 1 through pipe 2, pump 3, pipe 4, mixing chamber 6 and pipe 7 as in the modification shown in Figure 1. The mixture of oil and reagent passes into the lower end of a hoppered vertical tank 13, being introduced as shown in an upward direction. The settling reagent tends to collect in the lower end of the tank, by gravity, and the incoming oil stirs this up and mixes the said reagent with the oil. The upper part of the tank is of larger diameter and by the time the oil reaches the upper part of this tank the major quantity of the reagent will have settled out so that clear oil will flow through pipe 14 into a similar tank 15. Any small amount of reagent carried through pipe 14 will tend to settle in the lower part of tank 15, and if desired, a slow stream of oil can be passed continuously through pipe 16, pump 17 and pipe 18 back into the first treating chamber 13. The pump 17 can be run continuously or intermittently as desired. Th oil leaves the upper part of tank 15 by pipe 19, is passed through the filter press 20, pipe line 21 into storage tank 22. If desired, a pump may be introduced in pipe line 19.

The plates of the filter press 20 may be and preferably are, preliminarily coated with clay or with a mixture of the clay and chemicals as described above, as a preliminary operation. This mode of treatment may be advisable in plants which are already equipped with hopper bottom storage tanks or treating tanks, but I prefer the apparatus as shown in Figure 1.

As stated above the filter press method is far superior to the treating tank method. Not only is the apparatus greately simplified and made less expensive, but since clay and the chemicals are of substantially different specific gravities, there is considerable tendency for the chemicals to separate out from the clay in the tall treating tanks, copper chloride, for example, being a good deal heavier than clay a considerable portion of the copper chloride might settle out by gravity into the bottom of the tank 13, while the clay were still in suspension in the gasoline therein.

In the filter press method there is no opportunity for such separation.

It is rather remarkable that even with gasolines which are very high in sulphur a great amount of the gasoline can be sweetened by the use of a small quantity of the reagent. For example, gasoline from Winkler crude (West Texas) which is extremely high in sulphur, I have treated in the ratio of over 5,000 gallons of the gasoline with one pound of copper chloride. With such a gasoline however I would prefer to also employ the permanganate, in order to improve the color.

I have referred above, in the manufacture of the reagent, to grinding the clay and copper chloride in a ball mill. Another mode of operation would be to impregnate the clay with copper chloride solution, and then dry this at a relatively low temperature so as not to decompose the copper chloride. Another suitable method would be to grind the clay and copper chloride or potassium permanganate or manganate, in a somewhat moist condition, for example, containing 25 to 30% of water. This will produce a mixture which would be too moist, but the moisture content of this can be reduced, for example, by adding well dried clay to the mixture in the ball mill, for diluting the reagent down to the preferred 5% of copper chloride.

I have referred to the removal or alteration of sulphur in the sour oils. In order to get rid of the sourness, it is not necessary that the sulphur be wholly removed (i. e. taken out of the oil) if it is so changed that the oil will stand the "doctor test", i. e. treatment with sodium plumbite solution, without giving a brown or black color.

Figure 5 is one form of mixer which can be used at 6 (Figures 1 and 2).

When using a series of filter presses, as shown in Figure 3, I would coat the leaves of each of the presses, say at the beginning of the run, and the leaves of each press are of course coated by the method described above, before that press is used.

I claim:

1. The process for sweetening sour hydrocarbon oil which comprises contacting same with a mixture comprising adsorbent clay, cupric chloride and a permanganate.

2. The process for sweetening sour hydrocarbon oil distillates which comprises contacting same with a mixture comprising an absorbent earth, a compound reacting with mercaptans to form mercaptides, and a strongly oxidizing manganese compound.

3. The process for sweetening sour hydrocarbon oil distillates which comprises contacting same with a mixture comprising pulverized absorbent earth, a compound of a metal readily reactable with mercaptans to form mercaptides, and a strongly oxidizing manganese compound.

4. The process for sweetening sour hydrocarbon oil which comprises contacting same with a mixture comprising cupric chloride and an adsorbent material in the presence of an oxidizing manganese compound.

5. The process for sweetening sour hydrocarbon oil which comprises contacting same, in the presence of an oxidizing manganese compound, with a mixture comprising an adsorbent material and a compound which reacts with mercaptans to form mercaptides.

6. The process for sweetening sour hydrocarbon oil which comprises contacting same, in the presence of an alkali permanganate, with a mixture comprising an adsorbent material and a salt which reacts with mercaptans to form mercaptides.

7. The process for sweetening sour hydrocarbon oil which comprises contacting same, in the presence of a permanganate, with a mixture comprising an adsorbent material and cupric chloride.

CHARLES O. HOOVER.